United States Patent
Hoshino et al.

(10) Patent No.: US 8,316,271 B2
(45) Date of Patent: Nov. 20, 2012

(54) RADIO COMMUNICATION APPARATUS, RADIO COMMUNICATION SYSTEM AND RADIO COMMUNICATION METHOD

(75) Inventors: Masayuki Hoshino, Kanagawa (JP); Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 423 days.

(21) Appl. No.: 12/744,120

(22) PCT Filed: Sep. 4, 2008

(86) PCT No.: PCT/JP2008/002433
§ 371 (c)(1),
(2), (4) Date: May 21, 2010

(87) PCT Pub. No.: WO2009/066406
PCT Pub. Date: May 28, 2009

(65) Prior Publication Data
US 2010/0251057 A1    Sep. 30, 2010

(30) Foreign Application Priority Data
Nov. 22, 2007    (JP) ................................ P2007-303521

(51) Int. Cl.
*G06F 11/00* (2006.01)
(52) U.S. Cl. ........................................ 714/749; 714/748
(58) Field of Classification Search ........................ None
See application file for complete search history.

(56) References Cited

U.S. PATENT DOCUMENTS

| | | | | |
|---|---|---|---|---|
| 2001/0051824 A1* | 12/2001 | Hopkins et al. | ............... | 623/2.13 |
| 2003/0098992 A1* | 5/2003 | Park et al. | .................... | 358/1.15 |
| 2008/0010434 A1 | 1/2008 | Jitsukawa et al. | | |
| 2011/0064061 A1* | 3/2011 | Takeuchi et al. | ............... | 370/336 |
| 2011/0222483 A1* | 9/2011 | Yuda et al. | .................... | 370/329 |

FOREIGN PATENT DOCUMENTS

WO    2006/061911 A1    6/2006

OTHER PUBLICATIONS

Qualcomm Europe; "MIMO proposal for MIMO-WCDMA evaluation", 3G-PP TSG-RAN WG1 #42, Sep. 2, 2005, pp. 1-21, R1-050912.
International Search Report for PCT/JP2008/002433.

* cited by examiner

*Primary Examiner* — Michael Maskulinski
(74) *Attorney, Agent, or Firm* — Pearne & Gordon LLP

(57) ABSTRACT

Information on other code words can be utilized at the time of retransmitting, and transmission characteristics of the case of using multiple code words are improved. In a radio communication apparatus for transmitting data using multiple code words, as response time taken by a transmitting station to receive a response signal (Ack/Nack signal) after the data is transmitted from the transmitting station (BS) to a receiving station (UE), a cycle of second response time (RTT2) corresponding to a low-order code word is longer than a cycle of first response time (RTT1) corresponding to a high-order code word. In the receiving station, received data of the low-order code word is decoded using at least one of retransmission data and the first received data of the high-order code word and response signals are respectively generated according to a decoding result of each of the code words and notification of the response signal is provided. In the transmitting station, the response signal is acquired at timing of each of the code words and retransmitting control by HARQ is performed.

15 Claims, 8 Drawing Sheets

| Case | ERROR DETECTION RESULT (a) OF HIGH-ORDER CW | ERROR DETECTION RESULT (b) OF LOW-ORDER CW | ex_or(a,b) | Ack/Nack SIGNAL FOR LOW-ORDER CW |
|---|---|---|---|---|
| 1 | 1(OK) | 1 | 0 | 10 |
| 2 | 1 | 0 | 1 | 01 |
| 3 | 0(NG) | 1 | 1 | 11 |
| 4 | 0 | 0 | 0 | 00 |

| Case | ERROR DETECTION RESULT (a) OF HIGH-ORDER CW | ERROR DETECTION RESULT (b) OF LOW-ORDER CW | ex_or(a,b) | Ack/Nack SIGNAL FOR LOW-ORDER CW |
|---|---|---|---|---|
| 1 | 1(OK) | 1 | 0 | 1110 |
| 2 | 1 | 0 | 1 | 0001 |
| 3 | 0(NG) | 1 | 1 | 1111 |
| 4 | 0 | 0 | 0 | 0000 |

RADIO COMMUNICATION APPARATUS, RADIO COMMUNICATION SYSTEM AND RADIO COMMUNICATION METHOD

TECHNICAL FIELD

The present invention relates to a radio communication apparatus, a radio communication system and a radio communication method capable of being applied to MIMO (Multiple-Input Multiple-Output), etc. for conducting communication using multiple antennas.

BACKGROUND ART

In recent years, MIMO (Multiple-Input Multiple-Output) has received attention as a system for implementing high-speed transmission effectively using a frequency band limited in a radio communication technique. The MIMO is a technique for transmitting data using multiple antennas in both of transmitting and receiving. By transmitting various data from multiple transmitting antennas, a transmission capacity can be improved without expanding time and frequency resources.

Application of multiple code words (MCW: Multi Code Word) is effective as a data transmission method in the MIMO. In the multiple code words, after a CRC (Cyclic Redundancy Check) is assigned every data of each transmission path formed by multiple transmitting antennas or beams, an error correcting code such as a convolutional code, a Turbo code or an LDPC code is assigned and setting of a modulation and coding scheme (MCS) according to an SINR (Signal-to-Interference plus Noise power Ratio) corresponding to the appropriate transmission path (the transmitting antenna or beam) can be made. The flexible setting of the modulation and coding scheme can be made thus and moreover, error detection by the CRC can be performed every code word (CW) (every transmission path) in the multiple code words, so that a unit of retransmitting control can be set in a transmission path unit (a transmitting antenna or beam unit) and gain by the retransmitting control is obtained efficiently.

Here, the case of performing HARQ control using multiple code words in MIMO method as retransmitting control by hybrid-ARQ (Hybrid-Automatic Repeat reQuest) (hereinafter described as HARQ) in, for example, a cellular system for mobile communication such as a mobile telephone is considered. Here, the case of transmitting a signal from a radio base station (BS) used as a transmitting equipment (a transmitting station) to user equipment (UE) of a mobile station used as a receiving equipment (a receiving station) is illustrated. In this case, a pilot signal in a control channel, a control signal including multiple RV parameters disposed every code word, etc. are transmitted from the transmitting equipment to the receiving equipment. Also, Ack (Acknowledgement) or Nack (Negative Acknowledgement) every code word is transmitted as a response signal from the receiving equipment to the transmitting equipment.

FIG. 11 shows an operation example in HARQ control using multiple code words. A transmitting equipment (BS) respectively transmits transmission data data#1, data#2 to a receiving equipment (UE) in multiple code words CW1, CW2. In the receiving equipment, these transmission data data#1, data#2 are received and each of the data is decoded and Ack of the case where a received signal can be normally acquired or Nack of the case where a received signal has an error is transmitted to the transmitting equipment as a response signal every code word according to the availability of a decoding result. Here, the transmitting equipment retransmits data every code word when Nack is received from the receiving equipment. At the time of retransmitting, the receiving equipment respectively decodes the received retransmission data and synthesizes the retransmission data to the first received data (HARQ synthesis) every code word and transmits Ack or Nack to the transmitting equipment according to the right and wrong of the received data after synthesis.

In the HARQ synthesis for multiple code words as described above, the HARQ control is performed every code word, so that Ack/Nack feedback, Ack/Nack information, retransmission data of other code words, etc. cannot be utilized for Ack/Nack feedback, decoding, synthesis of the appropriate code word, etc. and energy used in retransmitting is wasted.

Non-patent Reference 1: 3GPP TSG RAN WG1 #42, R1-050912, Qualcomm Europe, "MIMO proposal for MIMO-WCDMA evaluation", Aug. 29-Sep. 2, 2005

DISCLOSURE OF THE INVENTION

Problems That the Invention is to Solve

As described above, in the case of performing the retransmitting control by the HARQ control etc. using the multiple code words, processing is performed every code word, that is, every transmission path by multiple transmitting antennas or beams constructing a data series which is a control unit of HARQ or MCS and in the appropriate code word, Ack/Nack information, retransmission data of other code words, etc. could not be conventionally used for decoding, synthesis, etc. of the code word. As a result of this, information on the other code words cannot be utilized effectively at the time of retransmitting and there is a problem of wasting energy.

The invention has been implemented in view of the circumstances described above, and an object of the invention is to provide a radio communication apparatus, a radio communication system and a radio communication method capable of utilizing information on other code words at the time of retransmitting and improving transmission characteristics of the case of using multiple code words.

Means for Solving the Problems

The present invention provides, as a first aspect, a radio communication apparatus for transmitting data using multiple code words, comprising: a transmitter which transmits data by the multiple code words; a response signal detector which detects a response signal from a destination station at timing corresponding to order of each of the code words according to response time set in a low-order code word longer than that of a high-order code word by predetermined order among the multiple code words as the response time taken to receive the response signal from the destination station after data is transmitted to the destination station; and a retransmitting controller which controls retransmitting of data transmitted by the multiple code words according to the response signal.

Consequently, retransmission data or the first transmission data of the high-order code word or a decoding result, etc. of the high-order code word can be utilized in the low-order code word and information on other code words can effectively be utilized at the time of retransmitting, so that transmission characteristics of the case of using the multiple code words can be improved.

The present invention includes, as a second aspect, the radio communication apparatus, wherein the response signal detector demodulates, according to the response time, a response signal of the high-order code word in a cycle of first response time corresponding to the high-order code word according to the response time and demodulates a response signal of the low-order code word in a cycle of second response time which is longer than the first response time and corresponds to the low-order code word.

Consequently, when the second response time corresponding to the low-order code word is made longer than the first response time corresponding to the high-order code word, the response signal of the high-order code word and the response signal of the low-order code word can be acquired at respective timings and proper retransmitting control can be implemented according to the response signal.

The present invention includes, as a third aspect, the radio communication apparatus, comprising a response signal demodulation result holder which holds a demodulation result of a response signal of the high-order code word, wherein the response signal detector demodulates a response signal of the low-order code word with reference to the demodulation result of the response signal of the high-order code word when the response signal of the low-order code word includes information on the response signal of the high-order code word.

Consequently, the response signal of the low-order code word includes the information on the response signal of the high-order code word and the response signal of the low-order code word is demodulated using the demodulation result of the response signal of the high-order code word and thereby, the response signal of the low-order code word can be acquired with high reliability.

The present invention provides, as a fourth aspect, a radio communication apparatus for transmitting data using multiple code words, comprising: a data decoder which decodes data transmitted by the multiple code words; and a response signal notifier which notifies a destination station of a response signal of each of the code words according to a decoding result of the data according to response time set in a low-order code word longer than that of a high-order code word by predetermined order among the multiple code words as the response time taken by the destination station to receive the response signal after the data is transmitted from the destination station.

Consequently, retransmission data or the first transmission data of the high-order code word or a decoding result, etc. of the high-order code word can be utilized in the low-order code word and information on other code words can effectively be utilized at the time of retransmitting, so that transmission characteristics of the case of using the multiple code words can be improved.

The present invention includes, as a fifth aspect, the radio communication apparatus, wherein the data decoder decodes, according to the response time, received data of the high-order code word in first response time corresponding to the high-order code word and decodes received data of the low-order code word using at least one of retransmission data and the first received data of the high-order code word in second response time which is longer than the first response time and corresponds to the low-order code word, and the response signal notifier generates a response signal according to a decoding result of the high-order code word in line with the first response time and generates a response signal according to a decoding result of the low-order code word in line with the second response time.

Consequently, when the second response time corresponding to the low-order code word is made longer than the first response time corresponding to the high-order code word, at least one of the retransmission data and the first received data of the high-order code word can effectively be used in decoding of the received data of the low-order code word. In this case, an interference elimination effect can be improved by synthesizing the data of the high-order CW at the time of decoding the received data of the low-order CW, and an effect by HARQ of the case of performing retransmitting control can be increased.

The present invention includes, as a sixth aspect, the radio communication apparatus, wherein, according to the response time, the response signal notifier provides notification of a response signal of the high-order code word in a cycle of first response time corresponding to the high-order code word and provides notification of a response signal of the low-order code word in a cycle of second response time which is longer than the first response time and corresponds to the low-order code word, and information on the response signal of the high-order code word is included using the response signal of the high-order code word notified previously or an allocation state of transmission data in which the response signal of the high-order code word is reflected in the case of generating the response signal of the low-order code word.

Consequently, notification of the response signal of the low-order code word can be provided with high reliability by including the information on the response signal of the high-order code word in the response signal of the low-order code word when the second response time corresponding to the low-order code word is made longer than the first response time corresponding to the high-order code word.

The present invention includes, as a seventh aspect, the radio communication apparatus, wherein information in which the contents of the response signal of the high-order code word are included as parity in the response signal of the low-order code word.

Consequently, the reliability of the response signal of the low-order code word can be enhanced.

The present invention includes, as an eighth aspect, the radio communication apparatus, wherein a cycle of response time corresponding to the low-order code word is substantially an integral multiple of a cycle of response time corresponding to the high-order code word.

Consequently, data decoding of the low-order code word, notification of the response signal, retransmitting control of each code word, etc. can be properly performed by effectively utilizing the data of the high-order code word.

The present invention includes, as a ninth aspect, the radio communication apparatus, wherein in order of the multiple code words, the high-order code word has high quality order and the low-order code word has low quality order in the multiple code words.

The present invention provides, as a tenth aspect, a radio communication base station equipment comprising the radio communication apparatus.

The present invention provides, as an eleventh aspect, a radio communication mobile station equipment comprising the radio communication apparatus.

The present invention provides, as a twelfth aspect, a radio communication system for transmitting data using multiple code words, comprising: a receiving equipment including: a data decoder which decodes data transmitted from a transmitting equipment by the multiple code words; and a response signal notifier which notifies the transmitting equipment of a response signal of each of the code words according to a decoding result of the data according to response time set in a low-order code word longer than that of a high-order code word by predetermined order among the multiple code words as the response time taken by the transmitting equipment to receive the response signal after the data is transmitted from the transmitting equipment to the receiving equipment, wherein the data decoder decodes received data of the low-order code word using at least one of retransmission data and the first received data of the high-order code word, and the transmitting equipment including: a transmitter which transmits data to the receiving equipment by the multiple code words; a response signal detector which respectively detects a response signal of the low-order code word and a response signal of the high-order code word from the receiving equipment at timing corresponding to order of each of the code words according to the response time; and a retransmitting controller which controls retransmitting of data transmitted by the multiple code words according to the response signal.

The present invention provides, as a thirteenth aspect, a radio communication system for transmitting data using multiple code words, comprising: a receiving equipment including: a data decoder which decodes data transmitted from a transmitting equipment by the multiple code words; and a response signal notifier which notifies the transmitting equipment of a response signal of each of the code words according to a decoding result of the data according to response time set in a low-order code word longer than that of a high-order code word by predetermined order among the multiple code words as the response time taken by the transmitting equipment to receive the response signal after the data is transmitted from the transmitting equipment to the receiving equipment, wherein the response signal notifier includes information on the response signal of the high-order code word using the response signal of the high-order code word notified previously or an allocation state of transmission data in which the response signal of the high-order code word is reflected in the case of generating the response signal of the low-order code word, and the transmitting equipment including: a transmitter which transmits data to the receiving equipment by the multiple code words; a response signal detector which respectively detects a response signal of the low-order code word and a response signal of the high-order code word from the receiving equipment at timing corresponding to order of each of the code words according to the response time and demodulates the response signal of the low-order code word with reference to a demodulation result of the response signal of the high-order code word when the response signal of the low-order code word includes the information on the response signal of the high-order code word; and a retransmitting controller which controls retransmitting of data transmitted by the multiple code words according to the response signal.

The present invention provides, as a fourteenth aspect, a radio communication method for transmitting data using multiple code words, comprising: in a receiving equipment, a data decoding step of decoding data transmitted from a transmitting equipment by the multiple code words, a response signal notifying step of notifying the transmitting equipment of a response signal of each of the code words according to a decoding result of the data according to response time set in a low-order code word longer than that of a high-order code word by predetermined order among the multiple code words as the response time taken by the transmitting equipment to receive the response signal after the data is transmitted from the transmitting equipment to receiving equipment, wherein received data of the low-order code word is decoded using at least one of retransmission data and the first received data of the high-order code word in the data decoding step; in the transmitting equipment, a transmitting step of transmitting data to the receiving equipment by the multiple code words; a response signal detecting step of respectively detecting a response signal of the low-order code word and a response signal of the high-order code word from the receiving equipment at timing corresponding to order of each of the code words according to the response time; and a retransmitting controlling step of controlling retransmitting of data transmitted by the multiple code words according to the response signal.

The present invention provides, as a fifteenth aspect, a radio communication method for transmitting data using multiple code words, comprising: in a receiving equipment, a data decoding step of decoding data transmitted from a transmitting equipment by the multiple code words; a response signal notifying step of notifying the transmitting equipment of a response signal of each of the code words according to a decoding result of the data according to response time set in a low-order code word longer than that of a high-order code word by predetermined order among the multiple code words as the response time taken by the transmitting equipment to receive the response signal after the data is transmitted from the transmitting equipment to receiving equipment, wherein information on the response signal of the high-order code word using the response signal of the high-order code word notified previously or an allocation state of transmission data in which the response signal of the high-order code word is reflected in the case of generating the response signal of the low-order code word is included in the response signal notifying step; in the transmitting equipment, a transmitting step of transmitting data to the receiving equipment by the multiple code words; a response signal detecting step of respectively detecting a response signal of the low-order code word and a response signal of the high-order code word from the receiving equipment at timing corresponding to order of each of the code words according to the response time and demodulating the response signal of the low-order code word with reference to a demodulation result of the response signal of the high-order code word when the response signal of the low-order code word includes the information on the response signal of the high-order code word; and a retransmitting controlling step of controlling retransmitting of data transmitted by the multiple code words according to the response signal.

Advantage of the Invention

According to the invention, a radio communication apparatus, a radio communication system and a radio communication method capable of utilizing information on other code words at the time of retransmitting and improving transmission characteristics of the case of using multiple code words can be provided.

DESCRIPTION OF REFERENCE NUMERALS AND SIGNS

101 RADIO BASE STATION
102 USER EQUIPMENT
311a,311b ANTENNA
312a,312b RECEIVING RF SECTION
313 CHANNEL ESTIMATOR
314 CONTROL SIGNAL DEMODULATOR
315 MIMO DEMODULATOR
316 HIGH-ORDER CW DECODER
317 LOW-ORDER CW DECODER
318 LIKELIHOOD RETAINER
319,320 CRC CHECKER
321 SINR MEASURER
322 FEEDBACK INFORMATION GENERATOR
323 Ack/Nack GENERATOR FOR HIGH-ORDER CW
324,751 Ack/Nack GENERATOR FOR LOW-ORDER CW
325 ENCODER
326 MULTIPLEXER
327 TRANSMITTING RF SECTION
431 ENCODER
432 RATE MATCHING SECTION
433 CONTROL SIGNAL GENERATOR
435 MIMO MULTIPLEXER
436a,436b TRANSMITTING RF SECTION
437a,437b ANTENNA
438 RECEIVING RF SECTION
439 SEPARATOR
440 DEMODULATOR AND DECODER
441 CRC CHECKER
442,862 Ack/Nack SIGNAL DEMODULATOR
443 CQI DEMODULATOR
444 SCHEDULER
861 Ack/Nack SIGNAL DEMODULATION RESULT RETAINER

BEST MODE FOR CARRYING OUT THE INVENTION

The present embodiments show a configuration example of the case where a transmitting equipment and a receiving equipment transmit signals by multiple antennas and perform retransmitting control (adaptive retransmitting control) by HARQ control using multiple code words in a radio communication system for adopting MIMO as one example of a radio communication apparatus, a radio communication system and a radio communication method according to the invention. In addition, the following embodiments are one example for explanation and the invention is not limited to the embodiments. In explanation of the following embodiments, a "code word" is abbreviated as a "CW".

Figure 1:
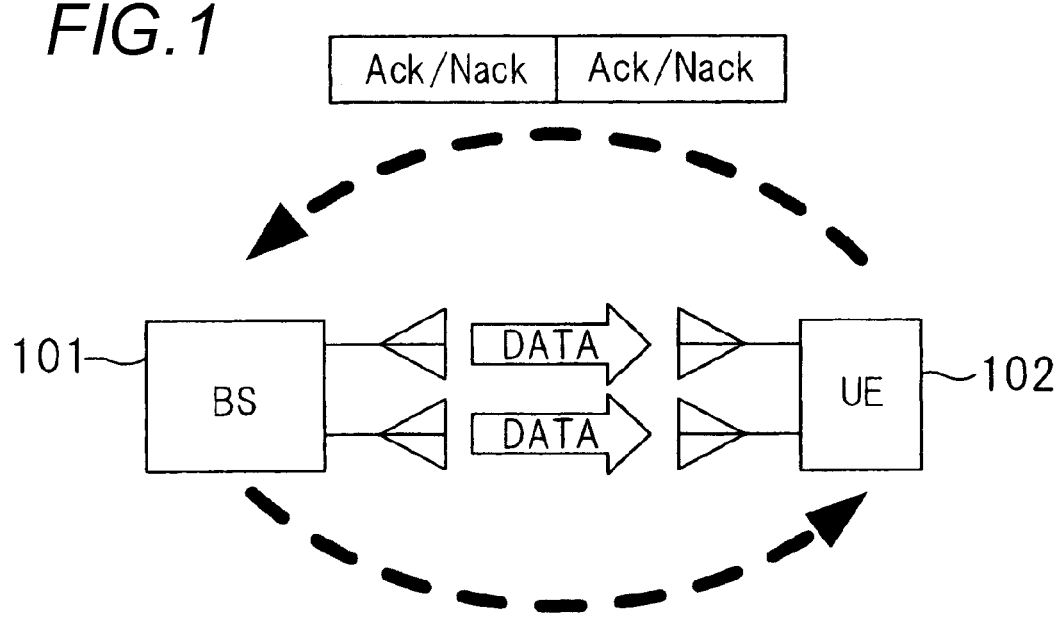
FIG. 1 schematically shows an example of a response signal transmitted in HARQ control using multiple code words.

FIG. 1 schematically shows an example of a response signal transmitted in HARQ control using multiple CWs. Here, an example of the case of transmitting a signal from a radio base station (BS) 101 used as a transmitting equipment (a transmitting station) to user equipment (UE) 102 of a mobile station used as a receiving equipment (a receiving station) by a MIMO method in a cellular system for mobile communication such as a mobile telephone is shown as one example. In addition, the example of FIG. 1 is an example of the case of transmitting a signal every antenna by multi antennas and also performing retransmitting control using multiple CWs in which the CW is assigned every antenna.

In the case of performing retransmitting control by HARQ control using multiple CWs, after data is transmitted from the transmitting equipment to the receiving equipment, Ack of the case where a received signal can be normally acquired or Nack of the case where a received signal has an error is transmitted from the receiving equipment to the transmitting equipment every CW as one example of a response signal. By controlling a modulation and coding scheme (MCS) in a transmission path unit by multiple transmitting antennas or beams at this time, each channel (transmission path) of the MIMO can be used effectively. Also, HARQ can be adaptively controlled in a CW unit (transmission path unit), so that there is an advantage of having good retransmitting efficiency.

In the case of performing the HARQ control using such multiple CWs, in a low-order CW of the multiple CWs, time taken to receive an Ack/Nack signal which is one example of a response signal from the completion of transmitting of transmission data is made longer than that of the other high-order CW in the embodiments. In this case, a CW with good reception quality (a CW with high quality order) is the high-order CW and a CW with reception quality worse than the others (a CW with low quality order) is the low-order CW in order of the reception quality such as an SINR in the multiple CWs. In addition, a cycle or time taken to receive the Ack/Nack signal of the response signal from transmitting of data to a destination station, that is, response time is called RTT (Round Trip Time). By setting of such response time, Ack/Nack information or retransmission data of the high-order CW can be used in the low-order CW in the case of performing the retransmitting control. A concrete example of the embodiments will hereinafter be described.

First Embodiment

Figure 2:
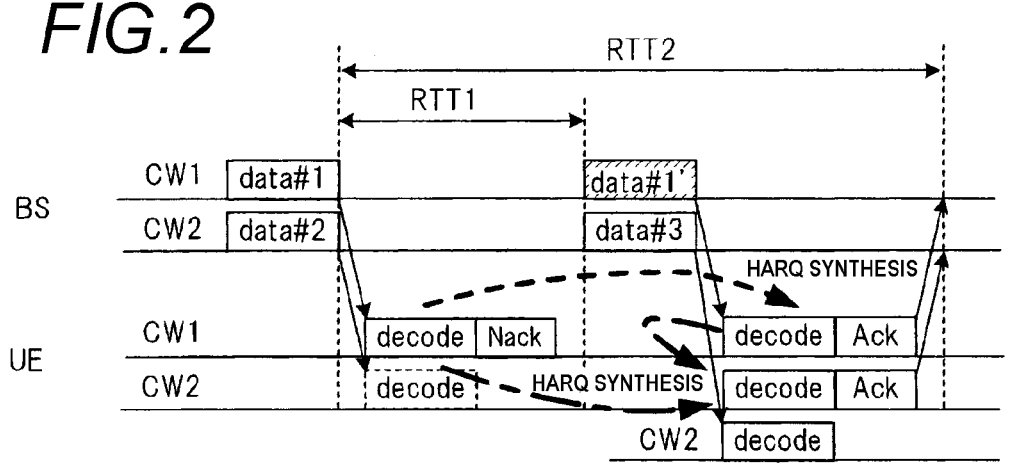
FIG. 2 shows an operation example of HARQ control using multiple code words in a first embodiment of the invention.

FIG. 2 shows an operation example of HARQ control using multiple CWs in a first embodiment of the invention.

In the first embodiment, in the case of performing retransmitting control by the HARQ control in the multiple CWs, response time (RTT) of a high-order CW is set at RTT1 (first response time) and response time (RTT) of a low-order CW is set at RTT2 (second response time) and the RTT of the low-order CW is made longer than that of the high-order CW. For example, a cycle of the second response time corresponding to the low-order CW is set at substantially an integral multiple (about two times in the present example) of a cycle of the response time corresponding to the high-order CW. Then, at the time of retransmitting, retransmission data of the high-order CW received previously is used in the low-order CW and received data of the low-order CW is synthesized to the first received data and the retransmission data of the high-order CW and the data are decoded. Consequently, the first received data and the retransmission data of the high-order CW can be utilized within the time to complete decoding and demodulation of the low-order CW, so that an effect of HARQ can be obtained better.

In the RTT, setting, control, etc. are performed in the transmitting side, for example, and the receiving side is instructed on the RTT by signaling etc. and an operation is performed based on the RTT every CW. In addition to this, for example, it may be constructed so as to be predetermined by a radio communication system and be recognized by both radio communication apparatuses of the transmitting side and the receiving side, and it may be constructed so that setting, control, etc. are performed in the receiving side and a control signal including RTT information is transmitted to the transmitting side and notification of a response signal is provided based on the RTT every CW.

A transmitting equipment (BS) respectively transmits transmission data data#1, data#2 to a receiving equipment (UE) in CW1, CW2 of multiple CWs. In the receiving equipment, these transmission data data#1, data#2 are received and in the high-order CW (CW1 in the example of FIG. 2) first, the data data#1 is decoded and Ack of the case where a received signal can be normally acquired or Nack of the case where a received signal has an error is replied to the transmitting equipment as a response signal according to the availability of a decoding result. Here, the case of Nack at the time of the first transmitting and performing retransmitting is assumed.

Next, the transmitting equipment transmits retransmission data data#1' of the high-order CW to the receiving equipment. In the low-order CW (CW2 in the example of FIG. 2), the next transmission data data#3 is transmitted. Then, the receiving equipment receives the retransmission data data#1' and the transmission data data#3, and first synthesizes the first received data data#1 to the retransmission data data#1' of the high-order CW (HARQ synthesis) and decodes the data, and replies Ack/Nack to the transmitting equipment according to the availability of a decoding result. FIG. 2 shows the case of Ack by the HARQ synthesis at the time of the second retransmitting. With this, the receiving equipment decodes received data data#2 of the low-order CW using the first received data and the retransmission data of the high-order CW. In this case, the first received data data#1 and the retransmission data data#1' of the high-order CW are synthesized to the received data data#2 of the low-order CW (HARQ synthesis) and the data are decoded. FIG. 2 shows the case of Ack by the HARQ synthesis using data of the high-order CW. Also, in the next received data data#3 of the low-order CW, HARQ synthesis is performed using data of the high-order CW similarly.

In the case of communication by the multiple CWs, signals of the other CWs become an interference signal and reception quality may reduce. When eliminating interference, as data of its elimination target can be distinguished more definitely, it becomes easy to eliminate the interference and an interference elimination effect becomes high. In the embodiment, by being synthesized to data of the low-order CW using data of the high-order CW and decoding the synthesis result, the interference of the high-order CW can be eliminated more effectively in the low-order CW. Consequently, an effect of HARQ can be enhanced effectively utilizing the data of the high-order CW and a probability of retransmitting in the low-order CW can be reduced and transmission characteristics of the case of using the multiple CWs can be improved.

Next, a configuration of a concrete example of the receiving equipment and the transmitting equipment of a radio communication system according to the first embodiment will be described.

Figure 3:
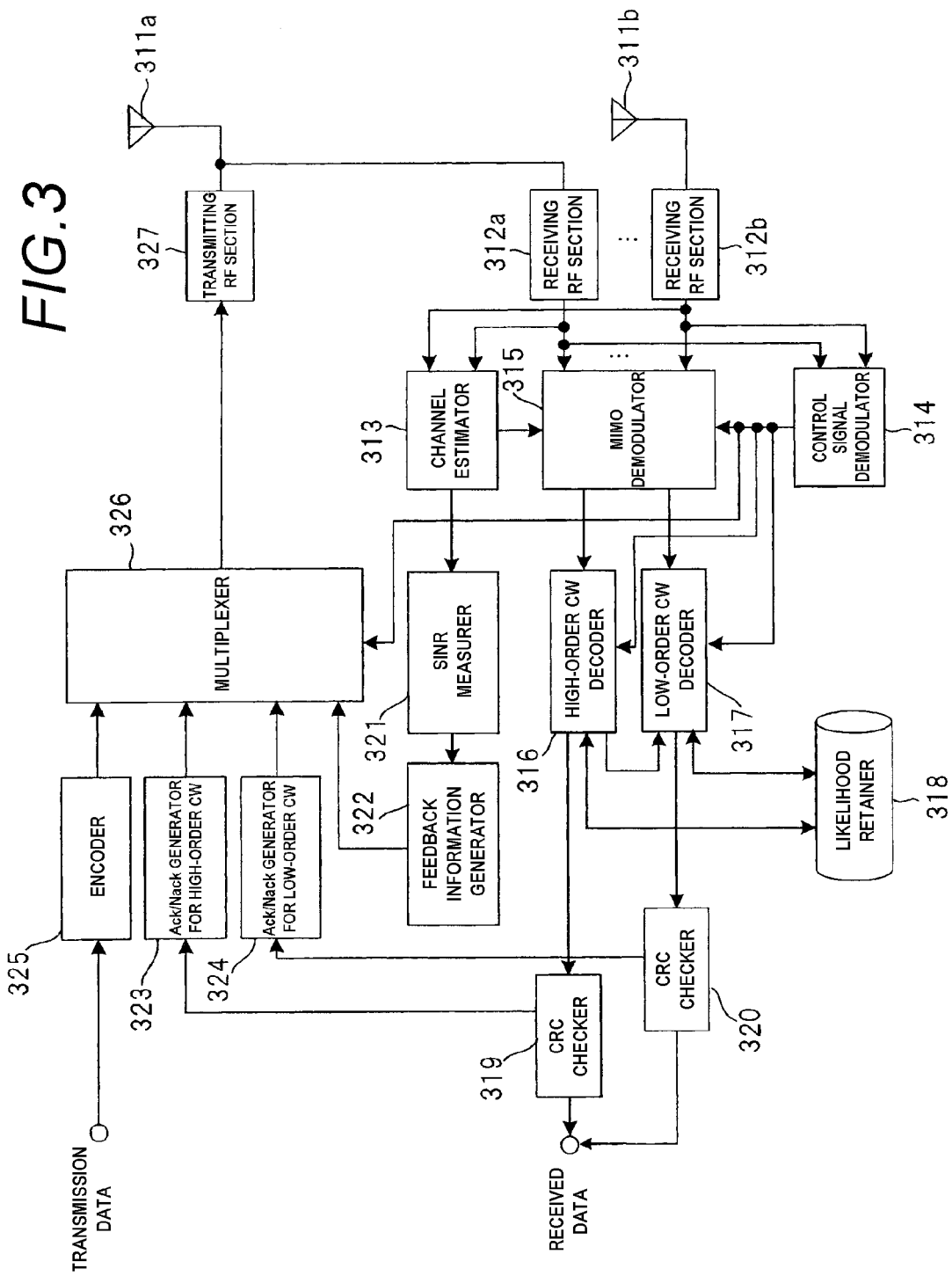
FIG. 3 is a block diagram showing a configuration of a main part of a receiving equipment (a receiving station) used in the first embodiment of the invention.
Figure 4:
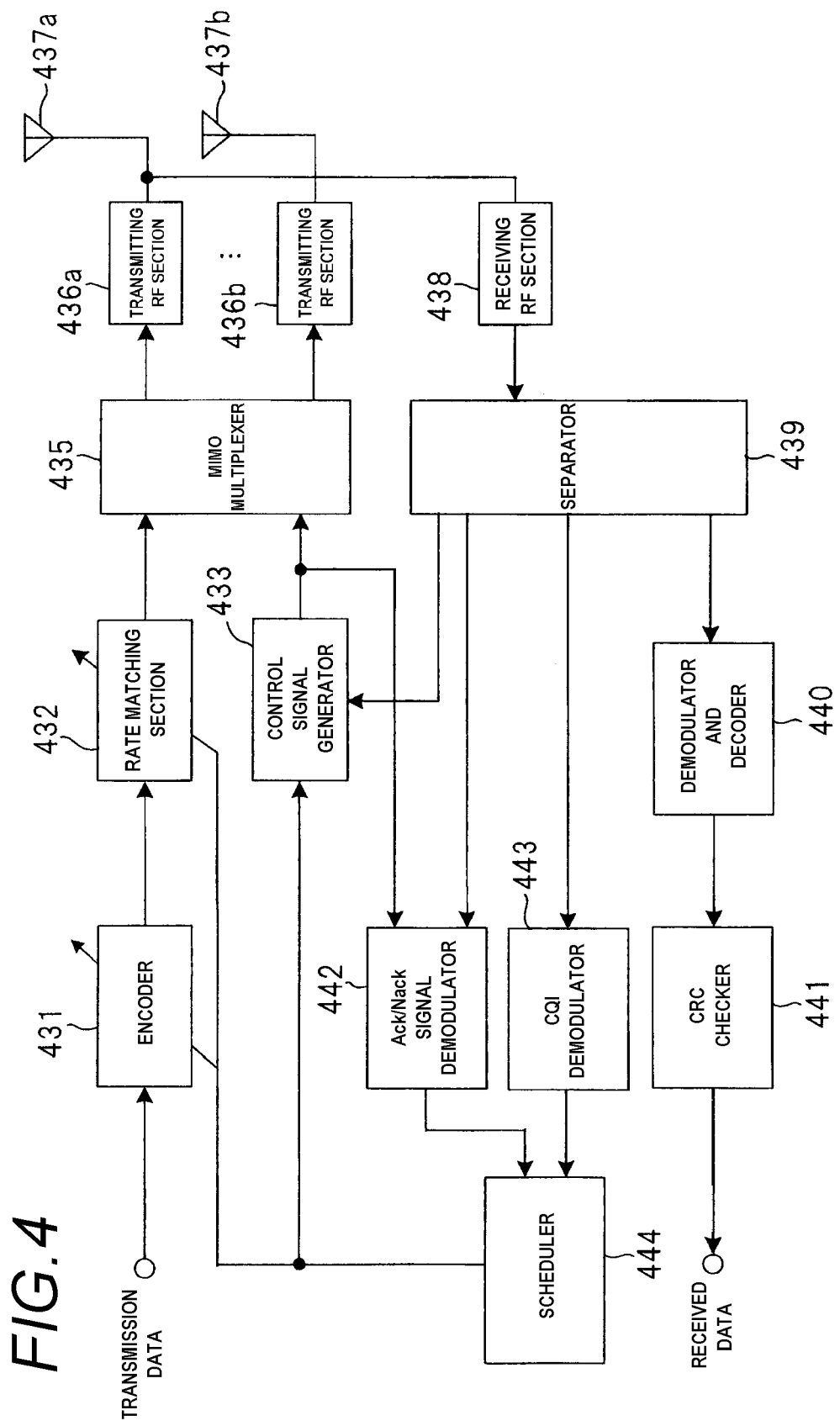
FIG. 4 is a block diagram showing a configuration of a main part of a transmitting equipment (a transmitting station) used in the first embodiment of the invention.

FIG. 3 is a block diagram showing a configuration of a main part of the receiving equipment (receiving station) used in the first embodiment of the invention, and FIG. 4 is a block diagram showing a configuration of a main part of the transmitting equipment (transmitting station) used in the first embodiment of the invention.

The embodiment assumes the case of conducting radio communication using radio waves between the receiving station shown in FIG. 3 and the transmitting station shown in FIG. 4. For example, it is assumed that the transmitting station (transmitting equipment) shown in FIG. 4 is applied to radio communication base station equipment (a radio base station, BS) of a cellular system for providing communication services of mobile communication such as a mobile telephone, and the receiving station (receiving equipment) shown in FIG. 3 is applied to user equipment (UE) which is radio communication mobile station equipment such as mobile telephone equipment. Also, it is herein presumed that a MIMO system for performing radio transmitting and receiving using multiple antennas in both of transmitting and receiving is constructed. In addition, as a form of a communication signal, for example, the case of conducting communication by a multicarrier communication method by an OFDM (Orthogonal Frequency Division Multiplexing) signal and sequentially transmitting in a packet unit is assumed.

The receiving station shown in FIG. 3 includes multiple antennas 311a, 311b, multiple receiving RF sections 312a, 312b, a channel estimator 313, a control signal demodulator 314, a MIMO demodulator 315, a high-order CW decoder 316, a low-order CW decoder 317, a likelihood retainer 318, CRC checkers 319, 320, an SINR measurer 321, a feedback information generator 322, an Ack/Nack generator 323 for high-order CW, an Ack/Nack generator 324 for low-order CW, an encoder 325, a multiplexer 326, and a transmitting RF section 327.

Radio waves transmitted from a destination station (for example, the transmitting station shown in FIG. 4) are respectively received by the multiple independent antennas 311a, 311b. After a high-frequency signal of the radio waves received by the antenna 311a is converted into a signal of a relatively low frequency band such as a baseband signal in the receiving RF section 312a, processing of Fourier transformation, parallel/serial conversion, etc. is performed and the signal is converted into a received signal of serial data. Similarly, after a high-frequency signal of the radio waves received by the antenna 311b is converted into a signal of a relatively low frequency band such as a baseband signal in the receiving RF section 312b, processing of Fourier transformation, parallel/serial conversion, etc. is performed and the signal is converted into a received signal of serial data. Outputs of these receiving RF sections 312a, 312b are inputted to the channel estimator 313, the control signal demodulator 314 and the MIMO demodulator 315.

The channel estimator 313 performs channel estimation based on a pilot signal included in a signal transmitted from each of the transmitting antennas of the destination station (the transmitting station), and calculates a channel estimate value. The calculated channel estimate value is inputted to the MIMO demodulator 315 and the SINR measurer 321. The control signal demodulator 314 demodulates a control signal transmitted together with the pilot signal, and extracts an RV parameter for retransmitting control such as a start position of a parity bit and a transmitting parameter indicated by a value corresponding to information called CQI such as a modulation and coding scheme of a transmitted signal. The demodulated control signal is inputted to the MIMO demodulator 315, the high-order CW decoder 316, the low-order CW decoder 317 and the multiplexer 326. Also, the control signal demodulator 314 notifies the low-order CW decoder 317 of a transmitting parameter about transmitting of a high-order CW together with a transmitting parameter of a low-order CW.

The MIMO demodulator 315 performs demodulation processing of a received signal corresponding to its own station using the channel estimate value received from the channel estimator 313. Then, rate dematching processing etc. are performed so that deinterleaving processing, a modulation multivalued number and a coding ratio match with those of the transmitting side. The high-order CW decoder 316 performs decoding processing of a received signal of the high-order CW inputted from the MIMO demodulator 315, and restores received data of the high-order CW. In this case, likelihood synthesis processing etc. for synthesizing likelihood information on the present received signal to likelihood information on the past received signal retained in the likelihood retainer 318 are performed.

The low-order CW decoder 317 performs decoding processing of a received signal of the low-order CW inputted from the MIMO demodulator 315, and restores received data of the low-order CW. At this time, the low-order CW decoder 317 decodes the received data of the low-order CW outputted by the MIMO demodulator 315 after a likelihood synthesis result is received from the high-order CW decoder 316.

The CRC checker 319 makes a CRC (Cyclic Redundancy Check) check of data outputted from the high-order CW decoder 316 with respect to a decoding result of the high-order CW, and examines the presence or absence of a data error. Also, the CRC checker 320 makes a CRC check of data outputted from the low-order CW decoder 317 with respect to a decoding result of the low-order CW. At this time, the CRC checker 319 outputs an error detection result of the high-order CW to the Ack/Nack generator 323 for high-order CW and the CRC checker 320 outputs an error detection result of the low-order CW to the Ack/Nack generator 324 for low-order CW. Then, the received data of the high-order CW and the low-order CW are respectively outputted from the CRC checkers 319, 320.

The SINR measurer 321 detects a reception state of a pilot signal and calculates an SINR of each CW every antenna. The calculated SINR of each CW is inputted to the feedback information generator 322. The feedback information generator 322 generates feedback information including information on the SINR of each CW, and outputs the feedback information to the multiplexer 326. This SINR of each CW corresponds to a CQI value which is information representing reception quality about a desired signal.

The Ack/Nack generator 323 for high-order CW generates an Ack/Nack signal based on the error detection result of the high-order CW from the CRC checker 319, and outputs the signal to the multiplexer 326. Here, when the decoding result is OK and succeeds in reception, Ack is outputted as a response signal and when the decoding result is NG and fails in the reception, Nack is outputted as the response signal. The ACK/Nack generator 324 for low-order CW generates an Ack/Nack signal based on the error detection result of the low-order CW from the CRC checker 320, and outputs the signal to the multiplexer 326.

The encoder 325 performs encoding processing of transmission data, and outputs the data to the multiplexer 326. The multiplexer 326 performs multiprocessing of a transmitted signal etc. including the encoded transmission data, the Ack/Nack signal and the feedback information inputted. Then, modulation processing, interleaving processing, rate matching processing, etc. for adaptively setting a modulation multivalued number or a coding ratio are performed, and an output to the transmitting RF section 327 is produced. In the transmitting RF section 327, after processing of inverse Fourier transformation, parallel/serial conversion, etc. is performed, conversion into a high-frequency signal of a predetermined radio frequency band is made and the electric power is amplified and then the signal is transmitted from the antenna 311a as radio waves. At this time, a signal including the response signal such as the Ack/Nack signal or the SINR of each CW transmitted from the receiving station is transmitted to the transmitting station as a feedback signal.

In the configuration described above, the high-order CW decoder 316 and the low-order CW decoder 317 implement a function of a data decoder. Also, the Ack/Nack generator 323 for high-order CW, the Ack/Nack generator 324 for low-order CW and the multiplexer 326 implement a function of a response signal notifier.

On the other hand, the transmitting station shown in FIG. 4 includes an encoder 431, a rate matching section 432, a control signal generator 433, a MIMO multiplexer 435, multiple transmitting RF sections 436a, 436b, multiple antennas 437a, 437b, a receiving RF section 438, a separator 439, a demodulator and decoder 440, a CRC checker 441, an Ack/Nack signal demodulator 442, a CQI demodulator 443, and a scheduler 444.

Radio waves transmitted from a destination station (for example, the receiving station shown in FIG. 3) are received by the antenna 437a. After a high-frequency signal of the radio waves received by the antenna 437a is converted into a signal of a relatively low frequency band such as a baseband signal in the receiving RF section 438, the signal is inputted to the separator 439. The separator 439 separates the portion corresponding to a feedback signal from a received signal, and extracts and outputs a response signal such as an Ack/Nack signal or an SINR of each CW included in the feedback signal. The SINR portion of each CW is inputted to the control signal generator 433 and the CQI demodulator 443, and the ACK/Nack signal portion is inputted to the Ack/Nack signal demodulator 442.

The demodulator and decoder 440 performs demodulation processing and decoding processing of the received signal separated by the separator 439, and restores received data. The CRC checker 441 makes a CRC check of data outputted from the demodulator and decoder 440, and determines the presence or absence of a data error, and the received data is outputted from the CRC checker 441.

The encoder 431 performs encoding processing of transmission data, and outputs the data to the rate matching section 432. The rate matching section 432 performs rate matching processing for adaptively setting a modulation multivalued number or a coding ratio, and produces an output to the MIMO multiplexer 435. Here, the encoder 431 and the rate matching section 432 perform the encoding processing and the rate matching processing based on a transmitting parameter outputted from the scheduler 444.

The control signal generator 433 generates a control signal including RTT information indicating response time, an RV parameter for retransmitting control such as a start position of a parity bit, a transmitting parameter indicated by a value corresponding to information called CQI such as a modulation and coding scheme of each CW of a transmitted signal based on the transmitting parameter from the scheduler 444 and the SINR of each CW from the separator 439, and outputs the control signal to the Ack/Nack signal demodulator 442 and the MIMO multiplexer 435.

The Ack/Nack signal demodulator 442 inputs the RTT information outputted from the control signal generator 433 at the time of transmitting data addressed to the appropriate receiving station, and respectively demodulates the Ack/Nack signals based on timing corresponding to each CW with respect to the Ack/Nack signal portions of the multiple CWs outputted from the separator 439. That is, the Ack/Nack signal of the CW1 which is the high-order CW is demodulated in a cycle of the RTT1 which is the response time of the high-order CW, and the Ack/Nack signal of the CW2 which is the low-order CW is demodulated in a cycle of the RTT2 which is the response time of the low-order CW. Here, RTT1<RTT2 is satisfied. Then, the demodulated Ack/Nack signals are outputted to the scheduler 444.

The CQI demodulator 443 demodulates the SINR portion of each CW outputted from the separator 439, and outputs a CQI value to the scheduler 444. The scheduler 444 sets the response time (RTT) and the transmitting parameter of each CW based on the CQI value from the CQI demodulator 443 and the Ack/Nack signals from the Ack/Nack signal demodulator 442, and schedules transmission data of the multiple CWs.

The MIMO multiplexer 435 performs multiprocessing of the control signal etc. including the RV parameter, the transmitting parameter and the transmitted signal including the encoded transmission data. Then, interleaving processing, modulation processing, etc. are performed, and respective transmitted signals outputted to the multiple antennas are separated and generated and are outputted to the transmitting RF sections 436a, 436b.

In the transmitting RF sections 436a, 436b, after processing of inverse Fourier transformation, parallel/serial conversion, etc. of the transmitted signals is performed, conversion into a high-frequency signal of a predetermined radio frequency band is made and the electric power is amplified and then the signals are transmitted from the antennas 437a, 437b as radio waves. The transmitted signals from the transmitting station are transmitted to the receiving station as a data signal etc. including various data, the control signal and the pilot signal.

In the configuration described above, the encoder 431, the rate matching section 432 and the MIMO multiplexer 435 implement a function of a transmitter. Also, the Ack/Nack signal demodulator 442 implements a function of a response signal detector. Also, the Ack/Nack signal demodulator 442 and the control signal generator 433 implement a function of a retransmitting controller.

Figure 5:
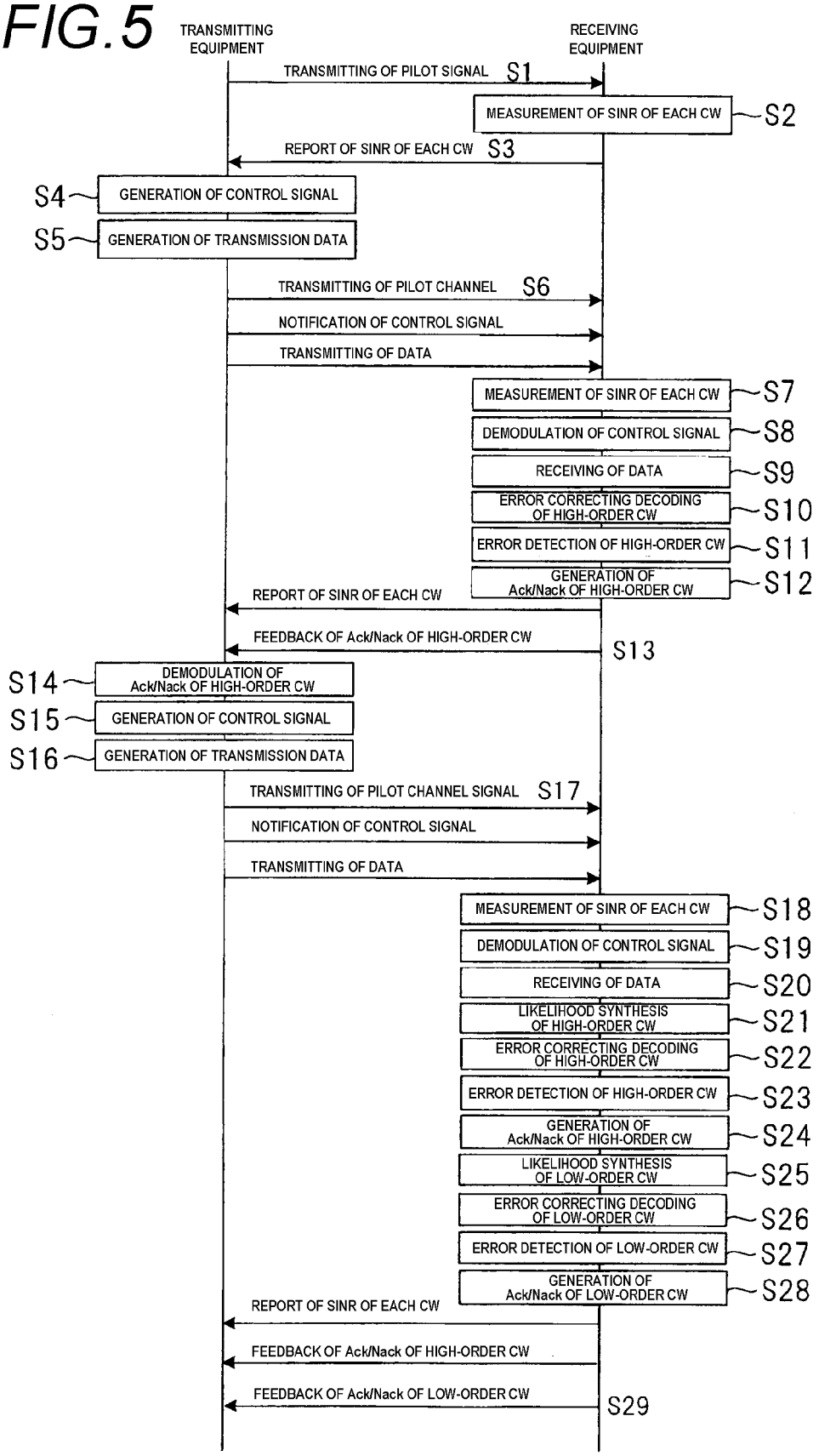
FIG. 5 is a sequence diagram showing a concrete example of a procedure of the whole processing on communication between the transmitting station and the receiving station in the first embodiment.

Next, a procedure of processing in the case of communicating between the receiving station shown in FIG. 3 and the transmitting station shown in FIG. 4 in the present embodiment will hereinafter be described with reference to FIG. 5. FIG. 5 is a sequence diagram showing a concrete example of a procedure of the whole processing about communication between the transmitting station and the receiving station in the first embodiment.

Step S1: The transmitting station (transmitting equipment) transmits a pilot signal to the receiving station (receiving equipment) by a pilot channel.

Step S2: The receiving station (receiving equipment) receives the pilot signal and observes a reception state of the pilot channel, and measures and calculates an SINR of each CW by the SINR measurer 321. At this time, quality orders of the SINRs in the multiple CWs are grasped.

Step S3: The receiving station generates feedback information including information on the SINR of each CW calculated in step S2 by the feedback information generator 322, and feeds back and reports the SINR of each CW from the receiving station to the transmitting station.

Step S4: The transmitting station sets a transmitting parameter (a modulation and coding scheme, etc.) of each CW by the scheduler 444 based on the SINR of each CW fed back from the receiving station, and generates a control signal including the transmitting parameter by the control signal generator 433. At this time, a high-order CW and a low-order CW are decided based on the SINR of each CW and order information on the CW is included in the control signal. The high order and the low order of this CW are decided by the SINR at the time of the first transmitting.

Step S5: The transmitting station performs processing by the encoder 431, the rate matching section 432 and the MIMO multiplexer 435 based on the transmitting parameter set in step S4, and generates transmission data of each CW.

Step S6: The transmitting station respectively transmits the pilot signal, the control signal and a data signal to the receiving station.

Step S7: The receiving station measures and calculates the SINR of each CW from the reception state of the pilot signal by the SINR measurer 321 like step S2.

Step S8: The receiving station demodulates the control signal by the control signal demodulator 314, and fetches the transmitting parameter such as the modulation and coding scheme.

Step S9: The receiving station obtains a channel estimate value corresponding to each CW received by the channel estimator 313, and performs receiving processing of each CW by demodulating received data using the transmitting parameter fetched in step S8 by the MIMO demodulator 315. Also in this case, received data of the high-order CW is decoded by the high-order CW decoder 316.

Step S10: The receiving station performs processing of error correcting decoding with respect to the received data of the high-order CW decoded by the high-order CW decoder 316 in step S9.

Step S11: The receiving station performs error detection processing of the high-order CW with respect to a received signal after the error correcting decoding of step S10 by the CRC checker 319.

Step S12: The receiving station generates a corresponding Ack/Nack signal by an error detection result of the high-order CW in step S11 by the Ack/Nack generator 323 for high-order CW.

Step S13: The receiving station generates feedback information including information on the SINR of each CW calculated in step S7 by the feedback information generator 322, and feeds back this SINR of each CW and the Ack/Nack signal of the high-order CW generated in step S12 to the transmitting station and gives a report.

Step S14: The transmitting station demodulates the Ack/Nack signal of the high-order CW based on the transmitting parameter (or the transmitting parameter reported from the receiving station) of the control signal generated in step S4.

Here, an operation of demodulation of the Ack/Nack signal of each CW in step S14 etc. will be described in detail. The operation of demodulation is one of the characteristic operations in the embodiment. The separator 439 separates the signal part corresponding to the Ack/Nack signal from the received signal, and outputs this Ack/Nack signal to the Ack/Nack signal demodulator 442. Then, the Ack/Nack signal demodulator 442 separately inputs the RTT outputted from the control signal generator 433 at the time of transmitting data addressed to the appropriate receiving station, and respectively demodulates the ACK/Nack signal every CW based on timing corresponding to each CW with respect to the Ack/Nack signal outputted from the separator 439.

The RTT of each CW shall be a value uniquely determined in the case where the scheduler 444 sets the transmitting parameter in step S4. A concrete set value of the RTT may be constructed so that the RTT of the low-order CW is set at the integral multiple of two or more with respect to the RTT of the high-order CW in the case of assuming the two CWs. Also, in the case of assuming four CWs, it can be constructed so that power-of-two values are used and, for example, the RTT of the second CW is two times the RTT of the first CW and the RTT of the third CW is four times the RTT of the first CW and the RTT of the fourth CW is eight times the RTT of the first CW.

Step S15: The transmitting station sets a transmitting parameter (a modulation and coding scheme, etc.) of each CW and generates a control signal as done in step S4 by the control signal generator 433 based on the demodulated Ack/Nack signal of the high-order CW and the SINR of each CW fed back from the receiving station.

Step S16: The transmitting station performs processing by the encoder 431, the rate matching section 432 and the MIMO multiplexer 435 based on the transmitting parameter set in step S15, and generates transmission data of each CW.

Step S17: The transmitting station respectively transmits the pilot signal, the control signal and a data signal to the receiving station.

Step S18: The receiving station measures and calculates the SINR of each CW from the reception state of the pilot signal by the SINR measurer 321 as in step S7.

Step S19: The receiving station demodulates the control signal by the control signal demodulator 314, and fetches the transmitting parameter such as the modulation and coding scheme.

Step S20: The receiving station obtains a channel estimate value corresponding to each CW received by the channel estimator 313, and performs receiving processing of each CW by demodulating received data using the transmitting parameter fetched in step S19 by the MIMO demodulator 315.

Step S21: The receiving station performs likelihood synthesis processing with respect to the high-order CW in which an error is detected in step S11, and decodes the received data of the high-order CW by the high-order CW decoder 316 and the likelihood retainer 318.

Step S22: The receiving station performs processing of error correcting decoding with respect to the received data of the high-order CW decoded by the high-order CW decoder 316 in step S21.

Step S23: The receiving station performs error detection processing of the high-order CW with respect to a received signal after the error correcting decoding of step S22 by the CRC checker 319.

Step S24: The receiving station generates a corresponding Ack/Nack signal by an error detection result of the high-order CW in step S23 by the Ack/Nack generator 323 for high-order CW like step S12.

Step S25: The receiving station performs likelihood synthesis processing with respect to the low-order CW using the likelihood synthesis result of the high-order CW of step S21, and decodes the received data of the low-order CW by the low-order CW decoder 317 and the likelihood retainer 318.

Here, an operation of decoding the low-order CW in step S25 will be described in detail. The operation of decoding is one of the characteristic operations in the embodiment. The control signal demodulator 314 notifies the low-order CW decoder 317 of the transmitting parameter about transmitting of the high-order CW together with the transmitting parameter of the low-order CW. Then, the low-order CW decoder 317 decodes the received data of the low-order CW outputted by the MIMO demodulator 315 after the likelihood synthesis result is received from the high-order CW decoder 316. As a method for utilizing the likelihood synthesis result of the high-order CW, the likelihood synthesis result can be used in intensity of the amount of interference in the received data and can be used as the interference component itself at the time of decoding by HARQ synthesis. Or, the high-order CW decoder 316 again performs decoding processing with respect to data in which the decoding processing is performed based on the likelihood synthesis result and generates a transmitted signal replica and outputs the replica to the low-order CW decoder 317 and thereby, use in interference cancel processing in the low-order CW decoder 317 can be made.

Step S26: The receiving station performs processing of error correcting decoding with respect to the received data of the low-order CW decoded by the low-order CW decoder 317 in step S25.

Step S27: The receiving station performs error detection processing of the low-order CW with respect to a received signal after the error correcting decoding of step S26 by the CRC checker 320.

Step S28: The receiving station generates a corresponding Ack/Nack signal by an error detection result of the low-order CW in step S27 by the Ack/Nack generator 324 for low-order CW.

Here, an operation of generation of the Ack/Nack signal of the low-order CW in step S28 will be described in detail. The operation of generation is one of the characteristic operations in the embodiment. The Ack/Nack generator 324 for low-order CW generates the Ack/Nack signal based on a CRC check result of the low-order CW by the CRC checker 320 and outputs the Ack/Nack signal to the multiplexer 326. As the Ack/Nack signal, when the CRC check result is OK, that is, an error is not included, Ack is generated and otherwise, Nack is generated. In this case, the RTT of the low-order CW is made longer than that of the high-order CW (RTT1<RTT2), so that the Ack/Nack signal is generated only at an interval longer than that of the Ack/Nack generator 323 for high-order CW.

Step S29: The receiving station generates feedback information including information on the SINR of each CW calculated in step S18 by the feedback information generator 322, and feeds back and reports this SINR of each CW, the Ack/Nack signal of the high-order CW generated in step S24 and the Ack/Nack signal of the low-order CW generated in step S28 to the transmitting station.

In the first embodiment as described above, in the response time RTT taken by the transmitting station to receive the response signal after data is transmitted from the transmitting station to the receiving station, the response time RTT2 of the low-order CW is set longer than the response time RTT1 of the high-order CW and in the case of decoding received data of the low-order CW, the received data is decoded by performing the HARQ synthesis using retransmission data and/or the first received data of the high-order CW. Consequently, the retransmission data or the first transmission data of the high-order CW can be utilized in the low-order CW and information on other code words can effectively be utilized at the time of retransmitting, so that transmission characteristics of the case of using the multiple CWs can be improved. Also, an interference elimination effect can be improved by synthesizing the data of the high-order CW at the time of decoding the received data of the low-order CW, so that an effect by HARQ of the case of performing retransmitting control can be increased.

In addition, in the embodiment, the high-order and low-order CWs according to the quality order are used as a target for setting the different RTT, but the high order and the low order of the CWs can also be set in order of the CWs previously designated by the transmitting equipment or the receiving equipment. Or, the high order and the low order of the CWs may be set in order of the CWs prescribed by the radio communication system, for example, in order of antenna/beam numbers.

Second Embodiment

Figure 6:
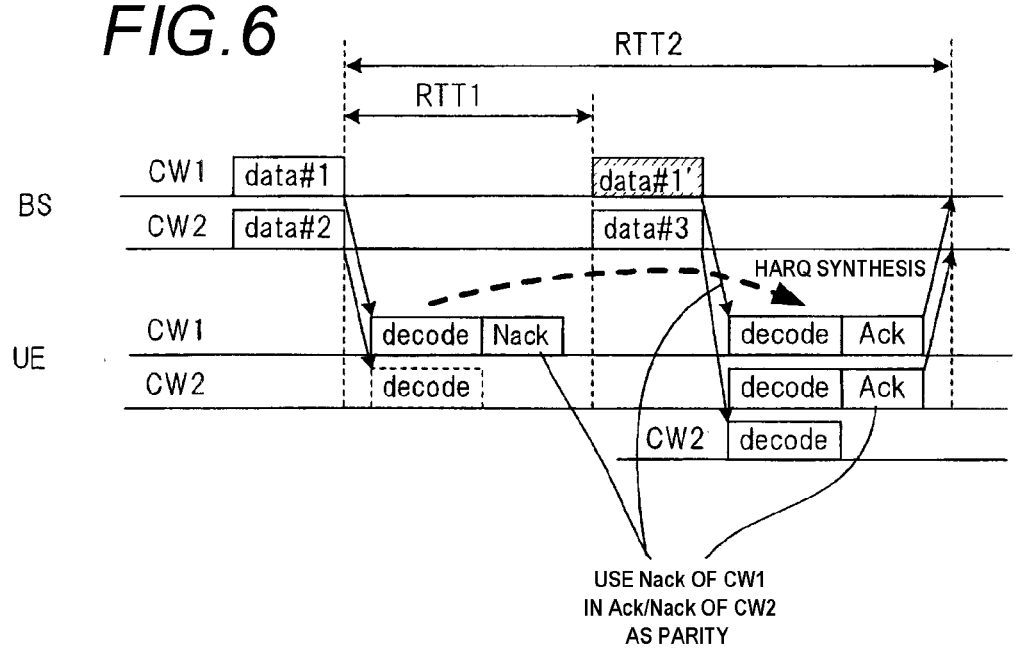
FIG. 6 shows an operation example of HARQ control using multiple code words in a second embodiment of the invention.

FIG. 6 shows an operation example of HARQ control using multiple CWs in a second embodiment of the invention.

In the second embodiment, in the case of performing retransmitting control by the HARQ control in the multiple CWs, response time RTT2 of a low-order CW is made longer than response time RTT1 of a high-order CW as in the first embodiment. Then, at the time of retransmitting, Ack/Nack information on the high-order CW exchanged previously is used in the low-order CW and the Ack/Nack information on the high-order CW is used as parity and an Ack/Nack signal of the low-order CW is generated. Consequently, notification of the Ack/Nack signal of the low-order CW can be provided with higher reliability by including the Ack/Nack information on the high-order CW.

A transmitting equipment (BS) respectively transmits transmission data data#1, data#2 to a receiving equipment (UE) in CW1, CW2 of multiple CWs. In the receiving equipment, these transmission data data#1, data#2 are received and in the high-order CW (CW1 in the example of FIG. 6) first, the received data data#1 is decoded and Ack of the case where a received signal can be normally acquired or Nack of the case where a received signal has an error is replied to the transmitting equipment as a response signal according to the availability of a decoding result. Here, the case of Nack at the time of the first transmitting and performing retransmitting is assumed.

Next, the transmitting equipment transmits retransmission data data#1' of the high-order CW to the receiving equipment. In the low-order CW (CW2 in the example of FIG. 6), the next transmission data data#3 is transmitted. Then, the receiving equipment receives the retransmission data data#1' and the transmission data data#3, and first synthesizes the first received data data#1 to the retransmission data data#1' of the high-order CW (HARQ synthesis) and decodes the data, and replies Ack/Nack to the transmitting equipment according to the availability of a decoding result. FIG. 6 shows the case of Ack by the HARQ synthesis at the time of the second retransmitting. With this, the receiving equipment decodes received data data#2 of the low-order CW. The low-order CW may be decoded by performing the HARQ synthesis using the first received data and the retransmission data of the high-order CW as in the first embodiment.

Then, according to the availability of the decoding result, an Ack/Nack signal of the low-order CW is generated using Ack/Nack information on the high-order CW at the time of the first transmitting in parity and the Ack/Nack signal is replied to the transmitting equipment as the response signal. In this case, the Ack/Nack information on the high-order CW used as the parity may be data of the Ack/Nack signal of which the receiving equipment itself notifies the transmitting equipment, or may use a signal allocation state (retransmitting or not) of transmission data (a downward signal) from the transmitting equipment to the receiving equipment in which feedback information on this high-order CW is reflected. In the case of using the signal allocation state from the transmitting equipment, a state of Ack/Nack could be determined by a control signal etc. in the receiving equipment.

Next, a configuration of a concrete example of receiving equipment and transmitting equipment of a radio communication system according to the second embodiment will be described.

Figure 7:
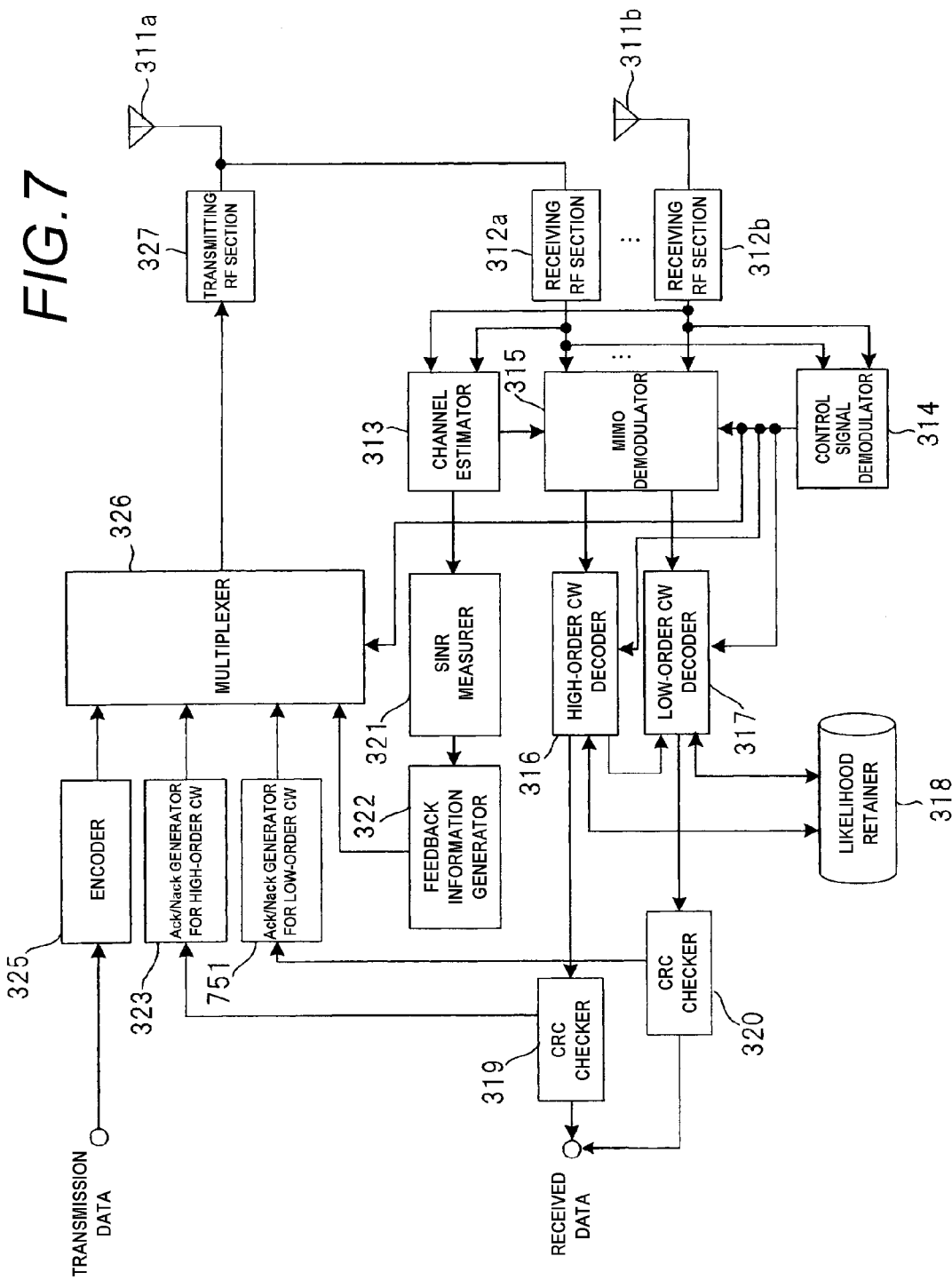
FIG. 7 is a block diagram showing a configuration of a main part of a receiving equipment (a receiving station) used in the second embodiment of the invention.
Figure 8:
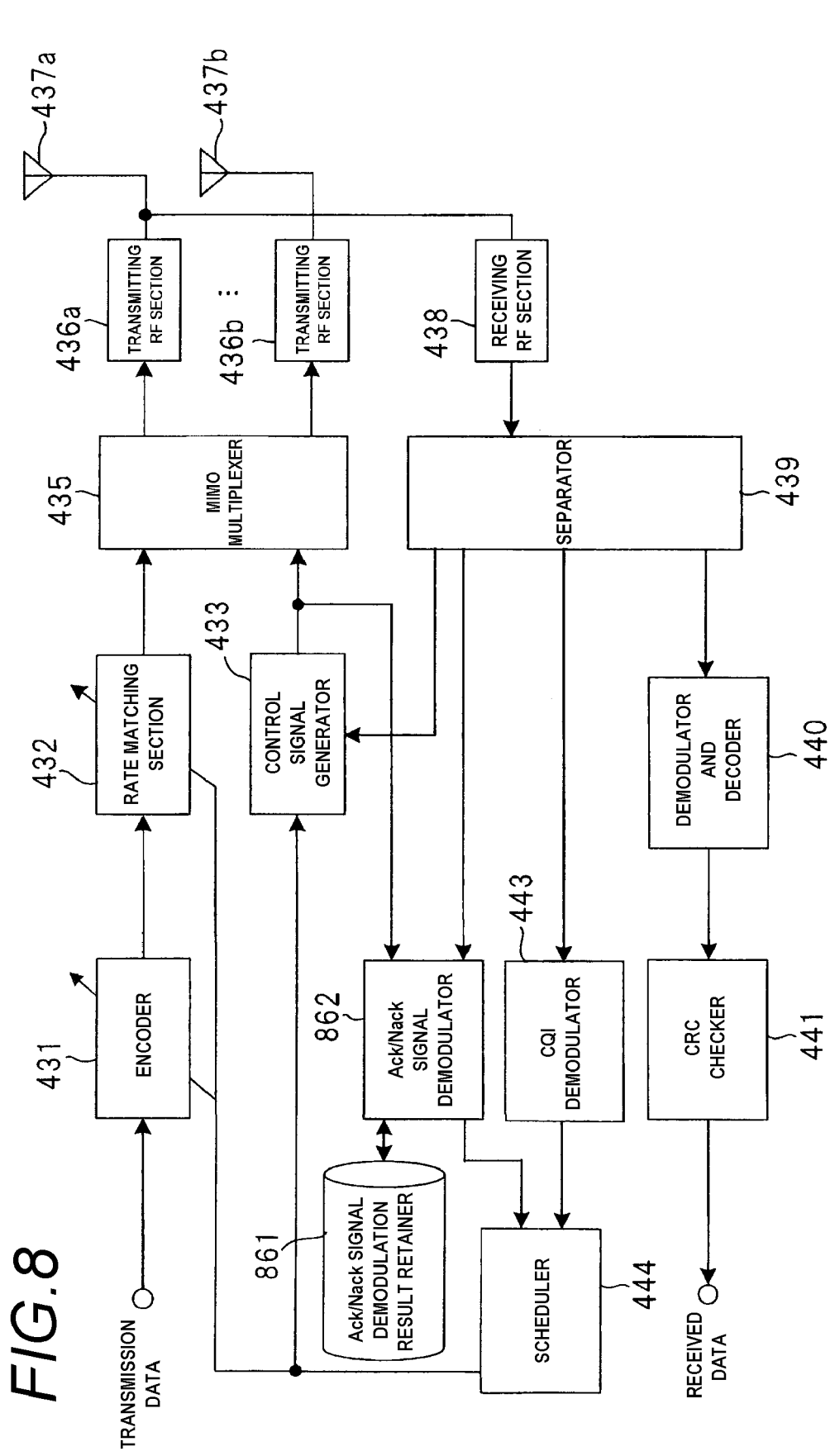
FIG. 8 is a block diagram showing a configuration of a main part of a transmitting equipment (a transmitting station) used in the second embodiment of the invention.

FIG. 7 is a block diagram showing a configuration of a main part of the receiving equipment (receiving station) used in the second embodiment of the invention, and FIG. 8 is a block diagram showing a configuration of a main part of the transmitting equipment (transmitting station) used in the second embodiment of the invention.

The second embodiment is the example of changing a part of the first embodiment. In addition, in the second embodiment, the same numerals are assigned to elements similar to those of the first embodiment and detailed explanation is omitted.

The receiving station shown in FIG. 7 differs from the configuration of FIG. 3 in an operation of an Ack/Nack generator 751 for low-order CW, and is configured to input outputs of a CRC checker 319 and a CRC checker 320 and generate an Ack/Nack signal. Here, an operation of generation of the Ack/Nack signal of the low-order CW will be described in detail. The operation of generation is one of the characteristic operations in the present embodiment.

The CRC checker 319 which receives data from a high-order CW decoder 316 after decoding outputs a result of a CRC check to an Ack/Nack generator 323 for high-order CW and also outputs the result to the Ack/Nack generator 751 for low-order CW. Similarly, the CRC checker 320 which receives data from a low-order CW decoder 317 after decoding outputs a result of a CRC check to the Ack/Nack generator 751 for low-order CW.

The Ack/Nack generator 751 for low-order CW refers to a CRC check result of a high-order CW and this result is used as a parity bit in the case of generating the Ack/Nack signal of the low-order CW.

Figures 9, 10, 11:
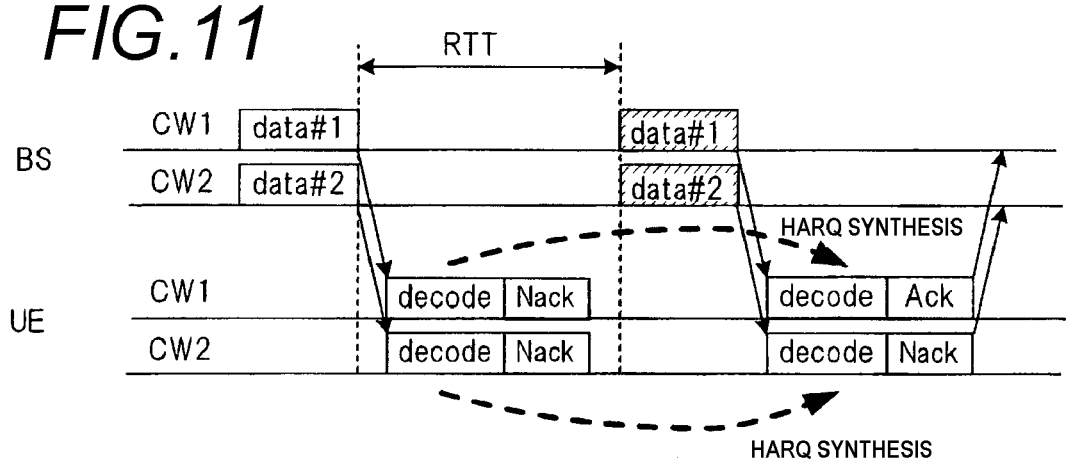
FIG. 9 shows a first example of generation of an Ack/Nack signal in the second embodiment.
FIG. 10 shows a second example of generation of an Ack/Nack signal in the second embodiment.
FIG. 11 shows an operation example in HARQ control using multiple code words.

A concrete example of a method for utilizing the CRC check result of the high-order CW in the Ack/Nack generator 751 for low-order CW is shown hereinafter. FIG. 9 shows a first example of generation of the Ack/Nack signal in the second embodiment. In this first example, an exclusive disjunction ex_or(a, b) of an error detection result a of the high-order CW and an error detection result b of the low-order CW is obtained and the exclusive disjunction is added to the error detection result b of the low-order CW and calculation is performed as an Ack/Nack signal (a signal of two bits) for low-order CW.

FIG. 10 shows a second example of generation of the Ack/Nack signal in the second embodiment. In this second example, an exclusive OR ex_or(a, b) of an error detection result a of the high-order CW and an error detection result b of the low-order CW is obtained as in the first example. Then, the tail end of a bit string in which the error detection result of the low-order CW is repeated four times is replaced with a result of the exclusive OR and calculation is performed as an Ack/Nack signal (a signal of four bits) for low-order CW.

In the configuration described above, the Ack/Nack generator 323 for high-order CW, the Ack/Nack generator 751 for low-order CW and a multiplexer 326 implement a function of a response signal notifier.

The bit of the tail end becomes a parity bit including the error detection result of the high-order CW by generating the Ack/Nack signal for low-order CW as described above. Consequently, the Ack/Nack signal using Ack/Nack information on the high-order CW can be generated in the low-order CW and reliability of the Ack/Nack signal can be improved.

On the other hand, the transmitting station shown in FIG. 8 differs from the configuration of FIG. 4 in an operation of an Ack/Nack signal demodulator 862 by disposing an Ack/Nack signal demodulation result retainer 861. Here, an operation of demodulation of the Ack/Nack signal of each CW will be described in detail. The operation of demodulation is one of the characteristic operations in the present embodiment.

A separator 439 separates the signal portion corresponding to the Ack/Nack signal from a received signal, and outputs this Ack/Nack signal to the Ack/Nack signal demodulator 862. Then, the Ack/Nack signal demodulator 862 separately inputs the RTT outputted from a control signal generator 433 at the time of transmitting data addressed to the appropriate receiving station, and respectively demodulates the ACK/Nack signal every CW based on timing corresponding to each CW with respect to the Ack/Nack signal outputted from the separator 439.

In the configuration described above, the Ack/Nack signal demodulation result retainer 861 implements a function of a response signal demodulation result holder, and the Ack/Nack signal demodulator 862 implements a function of a response signal detector.

Here, the Ack/Nack signal demodulator 862 outputs an Ack/Nack signal demodulation result of a high-order CW to the Ack/Nack signal demodulation result retainer 861, and holds Ack/Nack information on the high-order CW. Then, the Ack/Nack signal demodulator 862 fetches the Ack/Nack signal demodulation result of the high-order CW transmitted simultaneously with the appropriate CW from the Ack/Nack signal demodulation result retainer 861 in the case of demodulating an Ack/Nack signal of a low-order CW. An error detection result of the low-order CW is determined by comparing the Ack/Nack signal set as shown in FIG. 9 or FIG. 10 with the Ack/Nack signal of the low-order CW using this Ack/Nack information on the high-order CW.

In the second embodiment as described above, in the response time RTT taken by the transmitting station to receive the response signal after data is transmitted from the transmitting station to the receiving station, the response time RTT2 of the low-order CW is set longer than the response time RTT1 of the high-order CW and in the case of generating the Ack/Nack signal of the low-order CW, a decoding result of the high-order CW is added as parity and the Ack/Nack signal is generated. Consequently, notification of the Ack/Nack signal of the low-order CW can be provided with high reliability by including information on Ack/Nack of the high-order CW in the Ack/Nack signal of the low-order CW.

In addition, in the embodiments described above, the case where the number of multiple CWs used between the transmitting equipment and the receiving equipment is two is shown, but the number of CWs can be four, eight, etc., and it can similarly be applied to the case of increasing or decreasing according to the number of antennas, the number of beams, etc.

Also, as described above, the radio communication apparatus according to the invention can be mounted in base station equipment and mobile station equipment (communication terminal equipment) in a mobile communication system, and consequently, a radio communication mobile station equipment, a radio communication base station equipment and the mobile communication system having action and effect similar to the above can be provided.

In addition, the invention is not limited to the contents shown in the embodiments described above, and the invention also intends that those skilled in the art make change and application based on mention of the description and the well-known art, and the change and application are included in the scope of protection.

In each of the embodiments described above, the invention is described by taking the case of being configured by hardware as an example, but the invention can also be implemented by software.

Also, each of the functional blocks used in explanation of each of the embodiments described above is implemented as LSI which is an integrated circuit typically. These functional blocks may be individually made into one chip or may be made into one chip so as to include a part or all. Here, the LSI is used, but may be called an IC, system LSI, super LSI or ultra LSI depending on a difference in the degree of integration.

Also, a technique of forming the integrated circuit is not limited to the LSI, but may be implemented by a dedicated circuit or a general-purpose processor. A reconfigurable processor capable of reconfiguring setting or connection of a circuit cell of the inside of the LSI or an FPGA (Field Programmable Gate Array) capable of programming after the LSI is manufactured may be used.

Further, when technology of forming the integrated circuit replaced with the LSI by advances in semiconductor technology or other derivative technology emerges, the functional blocks may naturally be integrated using the technology. There is a possibility of adapting biotechnology etc.

The present application is based on Japanese patent application (patent application No. 2007-303521) filed on Nov. 22, 2007, and the contents of the patent application are hereby incorporated by reference.

INDUSTRIAL APPLICABILITY

The invention has an effect capable of utilizing information on other code words at the time of retransmitting and improving transmission characteristics of the case of using multiple code words, and is useful as a radio communication apparatus, a radio communication system, a radio communication method, etc. capable of being applied to MIMO (Multiple-Input Multiple-Output) etc. for conducting communication using multiple antennas.

The invention claimed is:

1. A radio communication apparatus for transmitting data using multiple code words, comprising:
   a transmitter which transmits data by the multiple code words;
   a response signal detector which detects a response signal from a destination station at timing corresponding to order of each of the code words according to response time set in a low-order code word longer than that of a high-order code word by predetermined order among the multiple code words as the response time taken to receive the response signal from the destination station after data is transmitted to the destination station; and
   a retransmitting controller which controls retransmitting of data transmitted by the multiple code words according to the response signal.

2. The radio communication apparatus as claimed in claim 1, wherein the response signal detector demodulates, according to the response time, a response signal of the high-order code word in a cycle of first response time corresponding to the high-order code word according to the response time and demodulates a response signal of the low-order code word in a cycle of second response time which is longer than the first response time and corresponds to the low-order code word.

3. The radio communication apparatus as claimed in claim 1, comprising
    a response signal demodulation result holder which holds a demodulation result of a response signal of the high-order code word, wherein
    the response signal detector demodulates a response signal of the low-order code word with reference to the demodulation result of the response signal of the high-order code word when the response signal of the low-order code word includes information on the response signal of the high-order code word.

4. The radio communication apparatus as claimed in claim 3, wherein information in which the contents of the response signal of the high-order code word are included as parity in the response signal of the low-order code word.

5. The radio communication apparatus as claimed in claim 1, wherein a cycle of response time corresponding to the low-order code word is substantially an integral multiple of a cycle of response time corresponding to the high-order code word.

6. The radio communication apparatus as claimed in claim 1, wherein in order of the multiple code words, the high-order code word has high quality order and the low-order code word has low quality order in the multiple code words.

7. A radio communication base station equipment comprising the radio communication apparatus as claimed in claim 1.

8. A radio communication mobile station equipment comprising the radio communication apparatus as claimed in claim 1.

9. A radio communication apparatus for transmitting data using multiple code words, comprising:
    a data decoder which decodes data transmitted by the multiple code words; and
    a response signal notifier which notifies a destination station of a response signal of each of the code words according to a decoding result of the data according to response time set in a low-order code word longer than that of a high-order code word by predetermined order among the multiple code words as the response time taken by the destination station to receive the response signal after the data is transmitted from the destination station.

10. The radio communication apparatus as claimed in claim 9, wherein the data decoder decodes, according to the response time, received data of the high-order code word in first response time corresponding to the high-order code word and decodes received data of the low-order code word using at least one of retransmission data and the first received data of the high-order code word in second response time which is longer than the first response time and corresponds to the low-order code word, and
    the response signal notifier generates a response signal according to a decoding result of the high-order code word in line with the first response time and generates a response signal according to a decoding result of the low-order code word in line with the second response time.

11. The radio communication apparatus as claimed in claim 9, wherein, according to the response time, the response signal notifier provides notification of a response signal of the high-order code word in a cycle of first response time corresponding to the high-order code word and provides notification of a response signal of the low-order code word in a cycle of second response time which is longer than the first response time and corresponds to the low-order code word, and information on the response signal of the high-order code word is included using the response signal of the high-order code word notified previously or an allocation state of transmission data in which the response signal of the high-order code word is reflected in the case of generating the response signal of the low-order code word.

12. A radio communication system for transmitting data using multiple code words, comprising:
    a receiving equipment including:
        a data decoder which decodes data transmitted from a transmitting equipment by the multiple code words; and
        a response signal notifier which notifies the transmitting equipment of a response signal of each of the code words according to a decoding result of the data according to response time set in a low-order code word longer than that of a high-order code word by predetermined order among the multiple code words as the response time taken by the transmitting equipment to receive the response signal after the data is transmitted from the transmitting equipment to the receiving equipment, wherein
        the data decoder decodes received data of the low-order code word using at least one of retransmission data and the first received data of the high-order code word, and
    the transmitting equipment including:
        a transmitter which transmits data to the receiving equipment by the multiple code words;
        a response signal detector which respectively detects a response signal of the low-order code word and a response signal of the high-order code word from the receiving equipment at timing corresponding to order of each of the code words according to the response time; and
        a retransmitting controller which controls retransmitting of data transmitted by the multiple code words according to the response signal.

13. A radio communication system for transmitting data using multiple code words, comprising:
    a receiving equipment including:
        a data decoder which decodes data transmitted from a transmitting equipment by the multiple code words; and
        a response signal notifier which notifies the transmitting equipment of a response signal of each of the code words according to a decoding result of the data according to response time set in a low-order code word longer than that of a high-order code word by predetermined order among the multiple code words as the response time taken by the transmitting equipment to receive the response signal after the data is transmitted from the transmitting equipment to the receiving equipment, wherein
        the response signal notifier includes information on the response signal of the high-order code word using the response signal of the high-order code word notified previously or an allocation state of transmission data in which the response signal of the high-order code word is reflected in the case of generating the response signal of the low-order code word, and
    the transmitting equipment including:
        a transmitter which transmits data to the receiving equipment by the multiple code words;
        a response signal detector which respectively detects a response signal of the low-order code word and a response signal of the high-order code word from the receiving equipment at timing corresponding to order of each of the code words according to the response time and demodulates the response signal of the low-order code word with reference to a demodulation result of the response signal of the high-order code word when the response signal of the low-order code word includes the information on the response signal of the high-order code word; and a retransmitting controller which controls retransmitting of data transmitted by the multiple code words according to the response signal.

14. A radio communication method for transmitting data using multiple code words, comprising:

in a receiving equipment, a data decoding step of decoding data transmitted from a transmitting equipment by the multiple code words, a response signal notifying step of notifying the transmitting equipment of a response signal of each of the code words according to a decoding result of the data according to response time set in a low-order code word longer than that of a high-order code word by predetermined order among the multiple code words as the response time taken by the transmitting equipment to receive the response signal after the data is transmitted from the transmitting equipment to receiving equipment, wherein received data of the low-order code word is decoded using at least one of retransmission data and the first received data of the high-order code word in the data decoding step;

in the transmitting equipment, a transmitting step of transmitting data to the receiving equipment by the multiple code words;

a response signal detecting step of respectively detecting a response signal of the low-order code word and a response signal of the high-order code word from the receiving equipment at timing corresponding to order of each of the code words according to the response time; and a retransmitting controlling step of controlling retransmitting of data transmitted by the multiple code words according to the response signal.

15. A radio communication method for transmitting data using multiple code words, comprising:

in a receiving equipment, a data decoding step of decoding data transmitted from a transmitting equipment by the multiple code words;

a response signal notifying step of notifying the transmitting equipment of a response signal of each of the code words according to a decoding result of the data according to response time set in a low-order code word longer than that of a high-order code word by predetermined order among the multiple code words as the response time taken by the transmitting equipment to receive the response signal after the data is transmitted from the transmitting equipment to receiving equipment, wherein information on the response signal of the high-order code word using the response signal of the high-order code word notified previously or an allocation state of transmission data in which the response signal of the high-order code word is reflected in the case of generating the response signal of the low-order code word is included in the response signal notifying step;

in the transmitting equipment, a transmitting step of transmitting data to the receiving equipment by the multiple code words;

a response signal detecting step of respectively detecting a response signal of the low-order code word and a response signal of the high-order code word from the receiving equipment at timing corresponding to order of each of the code words according to the response time and demodulating the response signal of the low-order code word with reference to a demodulation result of the response signal of the high-order code word when the response signal of the low-order code word includes the information on the response signal of the high-order code word; and a retransmitting controlling step of controlling retransmitting of data transmitted by the multiple code words according to the response signal.

* * * * *